(12) United States Patent  
Tamminen et al.

(10) Patent No.: US 8,888,076 B2
(45) Date of Patent: Nov. 18, 2014

(54) SECTION OF A SEPARATION COLUMN, SEPARATION COLUMN AND A METHOD OF OPERATION

(75) Inventors: Esa Tamminen, Porvoo (FI); Jari Sutinen, Porvoo (FI)

(73) Assignee: Neste Oil Oyj, Espoo (FI)

( * ) Notice: Subject to any disclaimer, the term of this patent is extended or adjusted under 35 U.S.C. 154(b) by 760 days.

(21) Appl. No.: 13/083,640

(22) Filed: Apr. 11, 2011

(65) Prior Publication Data

US 2011/0259728 A1 Oct. 27, 2011

Related U.S. Application Data

(60) Provisional application No. 61/327,112, filed on Apr. 23, 2010.

(30) Foreign Application Priority Data

Apr. 23, 2010 (EP) .................................... 10160891

(51) Int. Cl.
| | | |
|---|---|---|
| *B01F 3/04* | (2006.01) | |
| *B01D 53/18* | (2006.01) | |
| *B01D 45/08* | (2006.01) | |
| *B01D 3/00* | (2006.01) | |

(52) U.S. Cl.
CPC ............. *B01D 3/008* (2013.01); *B01D 53/185* (2013.01); *B01D 45/08* (2013.01)
USPC ............................................. 261/96; 261/109

(58) Field of Classification Search
CPC ....... B01D 3/008; B01D 45/08; B01D 53/185
USPC ..................... 261/96, 97, 109, 110; 202/158
See application file for complete search history.

(56) References Cited

U.S. PATENT DOCUMENTS

| | | | | |
|---|---|---|---|---|
| 3,637,195 A | * | 1/1972 | Blazer et al. | 261/30 |
| 4,782,857 A | * | 11/1988 | Bieri | 137/561 A |
| 5,558,818 A | * | 9/1996 | Gohara et al. | 261/17 |
| 5,605,654 A | * | 2/1997 | Hsieh et al. | 261/79.2 |
| 5,632,933 A | * | 5/1997 | Yeoman et al. | 261/109 |
| 6,341,765 B1 | * | 1/2002 | Moser | 261/96 |
| 6,641,700 B1 | | 11/2003 | Matsumoto et al. | |

(Continued)

FOREIGN PATENT DOCUMENTS

| | | |
|---|---|---|
| CN | 1268384 A | 1/2000 |
| CN | 1635926 A | 7/2005 |

(Continued)

OTHER PUBLICATIONS

Extended European Search Report of Oct. 6, 2010.

*Primary Examiner* — Charles Bushey
(74) *Attorney, Agent, or Firm* — Seppo Laine Oy; Joshua P. Wert (57) ABSTRACT

A separation column containing a feed distribution device and a feed distribution device for a separation column, such as a vacuum distillation column. The feed distribution device being capable of diffusing and directing a feed flow from a feed inlet so as to distribute the feed substantially evenly over the surface area of a separation plate in the column thereby increasing the columns efficiency. The separation column containing the feed distribution device being capable of shorter height, less costly design and lower operating cost than a separation column without the feed distribution device.

11 Claims, 10 Drawing Sheets

(56) References Cited

U.S. PATENT DOCUMENTS

| | | |
|---|---|---|
| 7,104,529 B2 * | 9/2006 | Laird et al. .................. 261/79.2 |
| 7,513,271 B2 * | 4/2009 | Bachmann et al. ............ 137/592 |
| 8,286,952 B2 * | 10/2012 | Lee et al. ..................... 261/79.2 |
| 2003/0172810 A1 | 9/2003 | Davis et al. |
| 2005/0029686 A1 | 2/2005 | Laird et al. |
| 2005/0060970 A1 * | 3/2005 | Polderman ...................... 55/320 |
| 2005/0236048 A1 * | 10/2005 | Griepsma et al. ............. 137/592 |
| 2007/0251384 A1 | 11/2007 | Kurukchi et al. |
| 2008/0290532 A1 * | 11/2008 | Kooijman et al. ............ 261/108 |

FOREIGN PATENT DOCUMENTS

| | | |
|---|---|---|
| DE | 102006049195 A1 | 4/2008 |
| GB | 1119699 | 7/1968 |
| WO | WO97/30780 A1 | 8/1997 |
| WO | WO0160478 A1 | 8/2001 |
| WO | WO03070348 A1 | 8/2003 |
| WO | WO2005058503 A1 | 6/2005 |

* cited by examiner

SECTION OF A SEPARATION COLUMN, SEPARATION COLUMN AND A METHOD OF OPERATION

CROSS-REFERENCE TO RELATED DOCUMENTS

The present patent application claims priority to Provisional Patent Application Ser. No. 61/327,112 filed Apr. 23, 2010, the complete disclosure of which is incorporated herein by reference.

FIELD OF THE INVENTION

The present invention relates to separation columns, in particular to distillation columns in which the feed is a gas, liquid or gas/liquid mixture. Such columns contain a section of column into which a feed flow is directed from one or more inlets. More particularly, the invention concerns improving the distribution of feed flow in such sections.

BACKGROUND OF THE INVENTION

In a distillation column where at least one of the feed streams contains a gas/liquid mixture, with a large fraction of the gas produced by a vaporization means upstream of the distillation column, it is necessary that the gas be directed to a separation section above the feed stream location. Usually it is desirable to separate the liquid from the gas more or less completely. Additionally, it is desirable to change the flow direction of the gas portion of the mixture. Most often the flow direction of the gas phase needs to be changed from a horizontal flow into a vertical or upward flow. The separation section which receives the gas flow also operates best when the gas is distributed uniformly across the entire cross-sectional area of the separation section.

In gas/liquid mixture contacting devices operating under vacuum pressure, the mixture entering the contacting device often has a high velocity. This high velocity makes any abrupt changes in the direction of flow difficult. Non-ideal distribution of the gas portion of the mixture to the cross section above the feed stream location correlates to the gas flow having high local vertical velocity component peaks when entering the contacting section.

The high velocity of these streams creates challenges to the design of gas/liquid contacting devices. The vertical distance between the feed inlets and the separation section above it should be kept minimum in order to keep the manufacturing cost of the contacting device reasonable. Additionally, increased contacting device height at this point/part also creates extra cost for auxiliary equipment such as pumps, as they have to be designed for increased capacity parameters (such as pump head). Further cost items impacted by increased contacting device height include structural steel, cabling, foundations etc.

One area in which gas/liquid contacting devices where the above described conditions prevail are in oil refineries; specifically in the atmospheric crude distillation unit, in the vacuum distillation unit for atmospheric crude bottoms and in various other distillation columns. A specific location in other distillation services is the reboiler return arrangement to the column, where the gas/liquid mixture is introduced to the column from a reboiler, often as flashing feed, which serves as vaporization means.

One of ordinary skill in the art will recognize that the above described conditions are present to at least some degree in all contacting devices where a feed is introduced to the device.

WO 2007/089888 and U.S. Pat. No. 5,972,171 address a separate problem of entrainment, a condition where rising vapor from a feed entrains impurities or contaminants, by altering the location and arrangement of feed inlets. In addition to this they introduce de-entrainment devices in the area of a feed inlet which consist of one or more plates in series, arranged in a radial fashion similar to that of a stopped fan and having a conduit located in the center of the radial plates. The purpose of these devices, unlike that of the present invention, is for the plates to be arranged substantially planar to the feed inlet so that the feed flows along the surface of the plate to produce a more pure vapor stream.

The present invention improves upon the prior art for at least the reasons that the feed distribution device, by itself, creates a resultant feed flow distribution within the input column section which does not require the feed inlets to be rearranged, creates a minimal pressure drop and is substantially simpler in design so that the feed flow dynamics of the system can be easily calculated and modeled.

SUMMARY OF THE INVENTION

An object of the present invention is to facilitate the distribution of feed as it is introduced to a contacting device column.

The object is achieved by providing a column section with a feed distribution device as herein described and claimed.

More specifically, it is an object to provide a feed distribution device which can be used to distribute the gas or vapor portion of the feed more evenly along the cross-sectional area of a separation section above the feed location compared to the distribution without a feed distribution device. An additional object is to, alone or in conjunction with distributing the feed more evenly, to use the feed distribution device is to reduce the maximum magnitude of local velocity of at least a portion of the feed as it is introduced to the separation section above the feed location.

A further object of the invention is to provide a solution for distributing the feed without causing a significant pressure drop in the system.

The above-mentioned objects are achieved by arranging at least one series of plates, with voids between them, known as a feed distribution device substantially in front of one or more feed inlets. The series of plates being arranged in such a position and formation as to sufficiently alter the flow of the inlet feed so that it is more evenly distributed along the cross-sectional area of the separation section above the feed location, and the maximum local velocity of the feed flow entering the separation section is reduced.

A section of a column for the separation of a feed product into its components according to the invention comprises at least one feed inlet to an interior portion of the column section and at least one feed distribution device located substantially in front of at least one feed inlet. The dimensions of the preferred feed distribution device are such that the vertical dimension of each plate is at least that of the vertical dimension of the feed inlet and the horizontal dimension of the series of plates and voids between the plates is at least that of the horizontal dimension of the feed inlet. However, the vertical dimension of each plate need not be at least that of the vertical dimension of the feed inlet as long as the vertical dimension is sufficient to achieve the goals of the design. The same applies to the horizontal dimension of the series of plates and voids.

During operation, the plates of the at least one feed distribution device deflect at least a part of a feed flow introduced to the section from said first feed inlet from its original direction defined by said feed inlet, to another direction, typically approaching a direction substantially parallel to the walls of the column, i.e. vertical. Another part of the feed flow is directed through the voids with no or significantly lower angle of deflection. Thus, a more even distribution of flow to the separation section above the feed inlet is achieved as compared with a situation with no feed distribution device in front of the feed inlet.

According to one embodiment, the separation column comprises at least one feed inlet from a reboiler introducing a flashed feed to a lower or bottom section of the column and having at least one feed distribution device located in the flow path of the flashed feed.

The method for altering flow properties of an input feed to a separation column, or a gas/liquid contacting column, according to the invention comprises introducing a feed with a vapor portion to section of a separation column having a feed distribution device substantially in the path of the feed flow so that at least the portion of the feed flow which is directed to a separation section above the feed inlet has the magnitude of its maximum local velocity reduced and the said portion of the feed flow is distributed substantially more evenly to the cross-sectional area of the said separation section.

In contrast to the arrangements disclosed in WO 2007/089888 and U.S. Pat. No. 5,972,171 referred to above, the flow distribution device of the present invention is arranged so as to deflect, diffuse and distribute the flow. Preferably, the flow, which can be a non-flashing feed flow or a flash feed flow, is deflected at an angle away from the original feed flow and not substantially parallel to the original as is the case with the de-entrainment devices.

Considerable advantages are achieved by means of the invention. With the addition of one or more feed distribution devices at the point feed is introduced to the system, feed flow properties that are harmful to the interior portion of the system, mainly high velocity, can be mitigated. Additionally, by diverting the direction of the flow so that it is distributed evenly to the cross-sectional area of the separation section above the said feed distribution device increases the efficiency of said separation section and simultaneously allows for minimizing the vertical dimension of column section. By minimizing the vertical dimension of the column section it allows for more cost effective column design and maintenance. Additional advantages to the present invention are that it allows multiple feed inlets to be located closer together, if desired for maintenance and design purposes while maintaining substantially even distribution of the portion of the feed directed to a separation section located above the column section in question as well as minimizing pressure loss in said section the column.

The feed distribution devices typically contain elongated plates and voids which are oriented are along the longitudinal axis of the column.

The column is preferably one of distillation, vacuum distillation, stripping, absorption, extraction, washing column or a combination thereof.

According to one embodiment, the plates of the feed distribution device or, in the case of a plurality of devices in series each of the feed distribution devices, is arranged in a linear formation, that is, along a straight line. Alternatively, the formation can a staggered line, regular arc, irregular arc or, for example, a V-formation. According to simulations and tests, a particularly advantageous formation is an arc having a center of curvature away from the feed inlet.

According to one embodiment, there is, in addition to a first feed distribution device, at least one second feed distribution device separate from and arranged in series, parallel or concentric to the first feed distribution device. The plates of the one or more second feed distribution devices in series with the first feed distribution device are preferably arranged at least partially in-line with the voids of the first feed distribution device. That is, the devices have at least one void in line in the direction of the feed stream as seen from the feed inlet.

According to one embodiment, there is a separation section above and/or below the one or more feed distribution devices. The separation section may be one for separation, distillation, heat transfer, extraction, wash operation or absorption.

According to one embodiment, the section has two feed inlets whose inlet directions are not exactly on opposite sides of the column. Thus, they are being separated by less than 180 degrees. In front of both feed inlets feed distribution devices according to the invention are arranged. Alternatively, a single feed distribution device according to the invention is used with sufficient horizontal dimension to be substantially in front of both feed inlets.

According to a preferred embodiment, the feed inlet is connected to an output of a device, such as a reboiler, which produces a flashing feed to the column. The plates of the at least one feed distribution device are arranged to deflect and reduce the magnitude of the velocity of at least a portion of the flash feed. The invention has particular benefits in the case of flashing feeds which as such would produce an uneven flow distribution into the separation section above the feed inlet, thus reducing separation efficiency.

Next, embodiment of the invention will be described more closely with reference to the attached drawings.

DETAILED DESCRIPTION OF EXEMPLARY EMBODIMENTS

There are numerous types and variations of contacting device columns. Some of the standard contacting device columns are distillation columns, stripping columns, absorption columns, extraction columns and washing columns. In addition to columns with a single purpose, many contacting columns are combinations of two or more standard processes (i.e. distillation and absorption). Further, there are categories such as packed columns and vacuum columns. One of ordinary skill in the art will recognize the applicability for the present invention in all of the types and variations of contacting devices enumerated above in addition to those not specifically enumerated but art recognized.

According to one embodiment, the contacting device column has at least one feed inlet and at least two outlets, one outlet for each portion of the feed to be separated in the column. In many cases there is a flow loop in which a stream is taken from the column, the stream is heated and the stream is then reintroduced back into the column. This reintroduced stream is also considered as a feed. At any section in a contacting device column in which there is a feed inlet that introduces feed to the system, there exists the potential for an uneven distribution of the gas portion of the feed to the section above the feed inlet as well as local velocities of the gas portion of the feed that are either damaging or not ideal to the said section above. The placement of a feed distribution device in such a feed inlet section allows for contacting device columns to operate more efficiently and allows for more cost-effective contacting device column design.

Figure 1A:
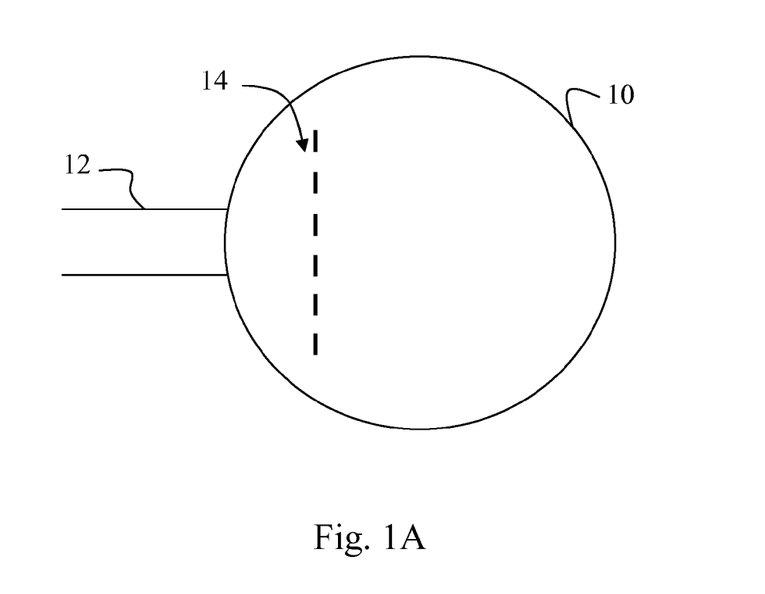
FIG. 1A is a top-down view of a section of a column with a single feed inlet and a single feed distribution device.
Figure 1B:
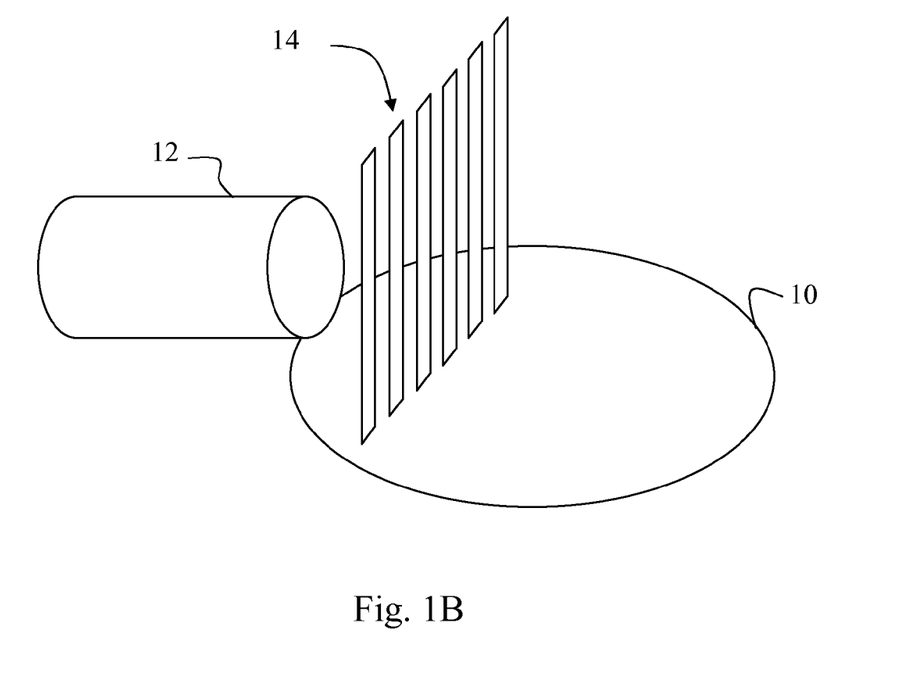
FIG. 1B is a 3-D representation of the section in 1A.

FIG. 1A shows the sidewall of a contacting device column 10 which encloses the interior portion of the contacting device column, a feed inlet 12 and a feed distribution device 14 located substantially in front of the feed inlet, which comprises six plates shown as dark lines and the five voids between the plates arranged in a straight line. FIG. 1B shows the same section and that the plates of the feed distribution device 14 extend vertically with a vertical dimension greater than that of the diameter of the feed inlet 12. Additionally, the horizontal dimension of the feed distribution device is greater than that of the diameter of the pipe. In practice, the dimensions of the feed distribution device, vertical and horizontal, need not be greater than that of the diameter of the pipe. The location of the feed distribution device substantially in front of the feed inlet is meant to mean that the device is located so that the flow exiting the feed inlet will contact at least a portion of the feed distribution device i.e. either the plates and/or voids between the plates. It is contemplated that the device can be located either directly in front of the feed inlet, or placed a distance from the feed inlet while remaining substantially in front of the feed inlet as shown in FIGS. 1A and 1B. Additionally, it is preferable but not necessary that the feed distribution device is oriented substantially in front of the feed inlet so that the face of the feed distribution device having the series of plates and voids is presented to the feed inlet as shown in FIGS. 1A and 1B.

Figure 2A:
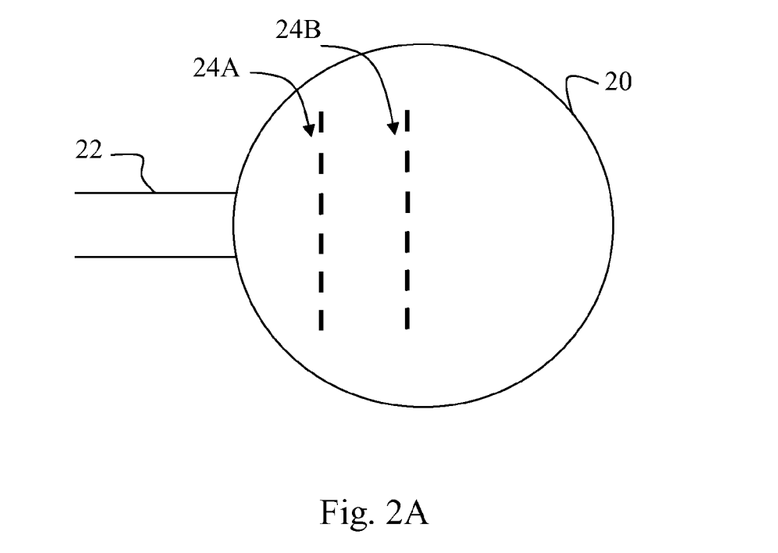
FIG. 2A is a top-down view of a section of a column with a single feed inlet and two parallel feed distribution devices.
Figure 2B:
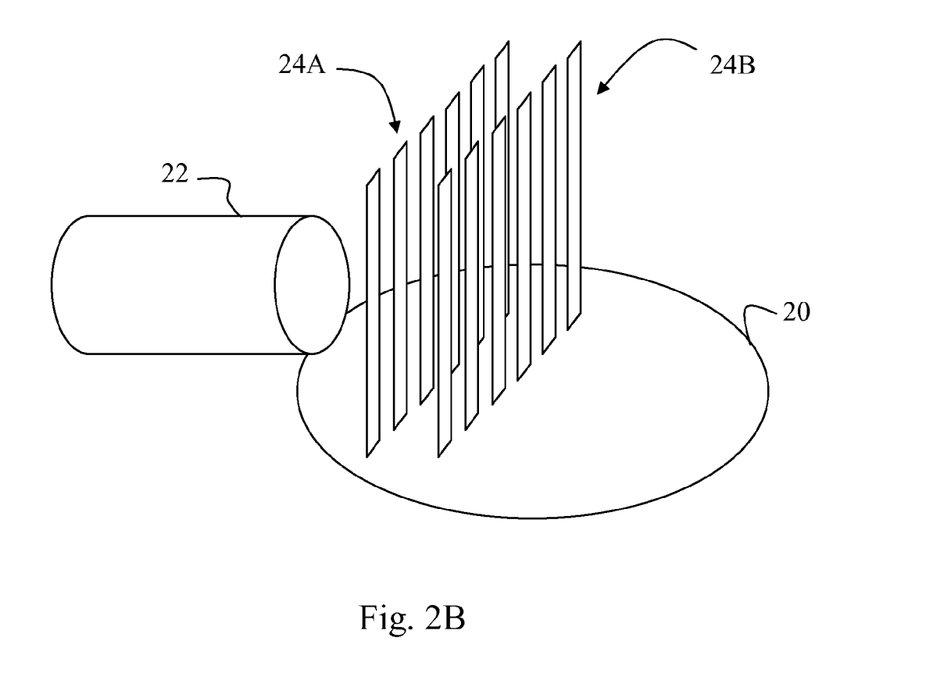
FIG. 2B is a 3-D representation of the section in 2B.

Based on the flow parameters of the feed it can be advantageous to have multiple feed distribution devices located substantially in front of a feed inlet. FIG. 2A shows the sidewall of a contacting device column 20 which encloses the interior portion of the contacting device column, a feed inlet 22 and two feed distribution devices 24A and 24B. Similar to FIG. 1A, each feed distribution device is located substantially in front of the feed inlet and comprises six plates and five voids each. Additionally, both feed distribution devices are arranged in series parallel to one another with the plates of the second 24B aligned with those of the first 24A. FIG. 2B shows another view of the same system.

Figure 3:
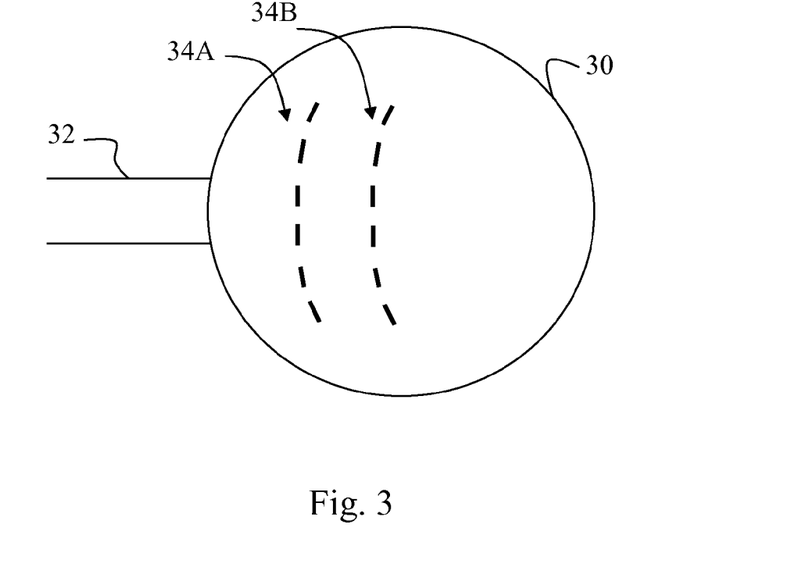
FIG. 3 is a top-down view of a section of a column with a single feed inlet and two concentric feed distribution devices.
Figure 4:
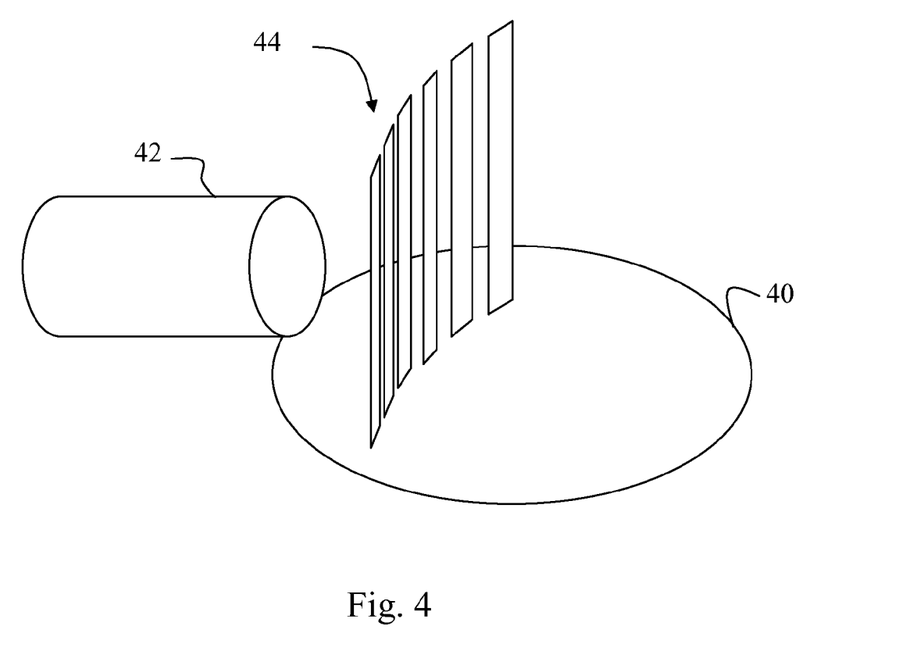
FIG. 4 is a 3-D representation of a section of a column with a single feed distribution device arranged as an irregular arc.

FIG. 3, similar to FIG. 2, shows the sidewall of a contacting device column 30 which encloses the interior portion of the contacting device column, a feed inlet 32 and two feed distribution devices 34A and 34B. Opposed to FIG. 2, the feed distribution devices 34A and 34B are each arranged in the formation of an irregular arc, such that the radius of the arc is not constant, and together in a series of concentric irregular arcs. FIG. 4 shows a single feed distribution device 44 arranged in a formation of an irregular arc similar to that of 34A and 34B located substantially in front of a feed inlet 42 and in the interior portion of a contacting device column defined by the contacting device column 40.

Figure 5:
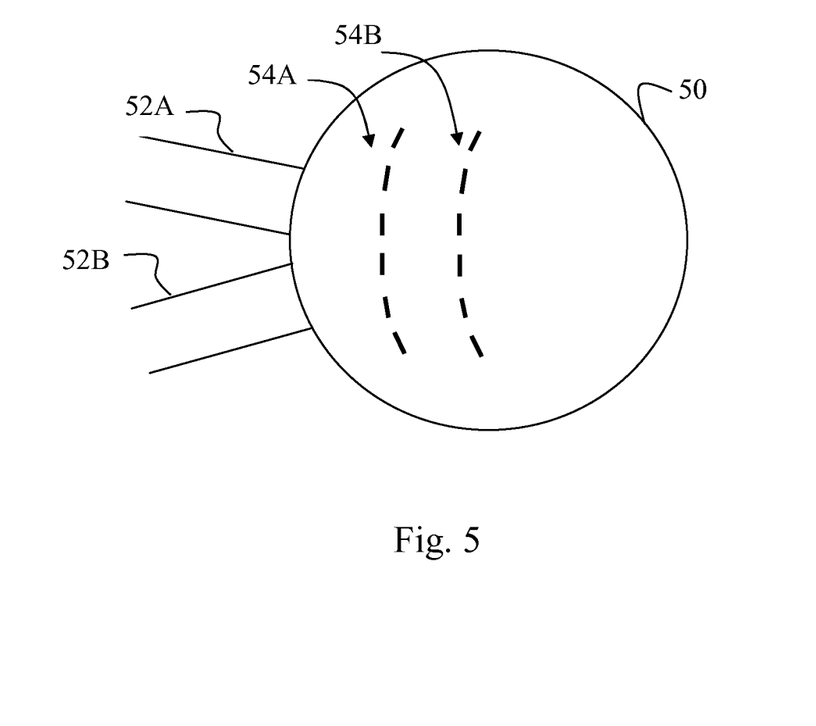
FIG. 5 is a top-down view of a section of a column with two feed inlets and two concentric feed distribution devices.

It is common in contacting device columns for two or more feed inlets to introduce multiple feed flows in to a single section of a contacting device column. In such situations the stated problems of a single feed inlet system can be exaggerated. For instance, FIG. 5 shows the sidewall of a contacting device column 50 which encloses the interior portion of the contacting device column, two feed inlets 52A and 52B, and two feed distribution devices 54A and 54B arranged in a series of concentric irregular arcs. Two feed inlets may be arranged asymmetrically with less than 180 degrees of separation as shown in the figure. In these cases, the flows from feed inlets 52A and 52B entering the section do not do so ideally and this causes less than uniform distribution on the cross-sectional area of the separation section above the feed inlets. In the present example, feed distribution devices 54A and 54B have sufficient horizontal dimensions to be located substantially in front of both feed inlets simultaneously.

Figure 6A:
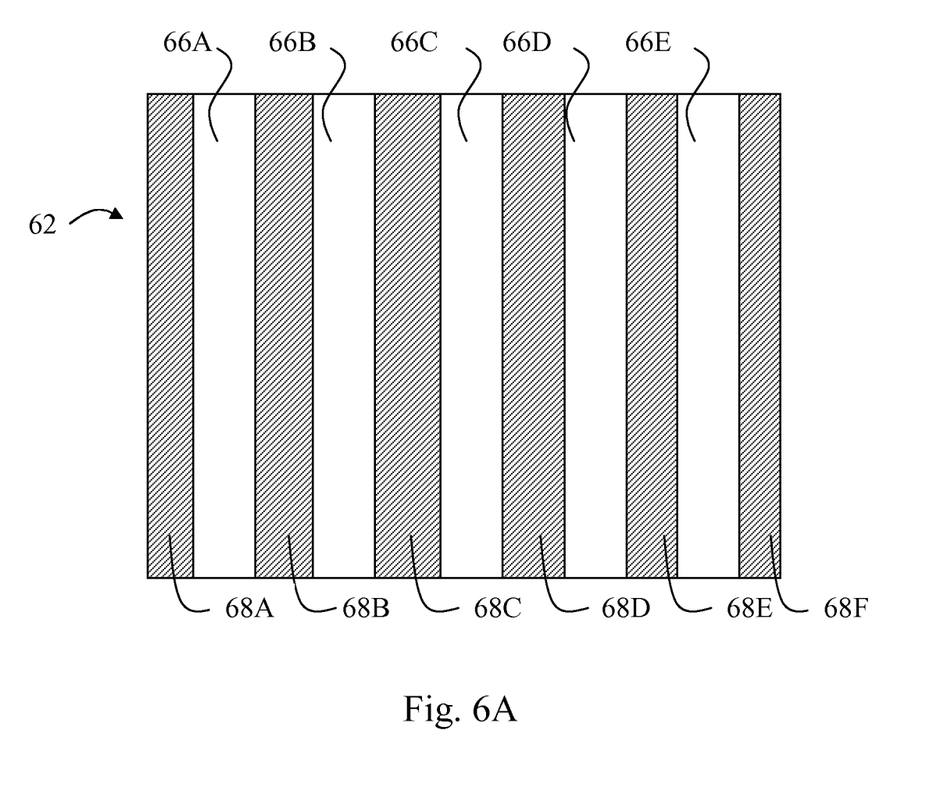
FIG. 6A is a frontal view of a feed distribution device.

An exemplary feed distribution device 62 is represented in FIG. 6A. Each feed distribution device is comprised of a series of plates 68A-F. Between the series of plates is a series of voids 66A-E. In the present example the series of voids is one less in number than the series of plates. The material of the plates can be chosen by a designer based on the design parameters of the contacting device column, the makeup of the feed, the flow parameters of the feed, the operating cost, etc. and may be uniform for all plates or may vary amongst the plates in a single feed distribution device. The plates may be solid or they may contain openings. The plates may also have a flat face or they may have a texture or design on one or both faces. The horizontal, vertical and thickness dimensions of each individual plate may vary within the feed distribution device as well as between several feed distribution devices depending on the mechanical stress caused by the high velocity feed flow entering the column section and eventually hitting the plates of the said feed distribution device.

Figure 6B:
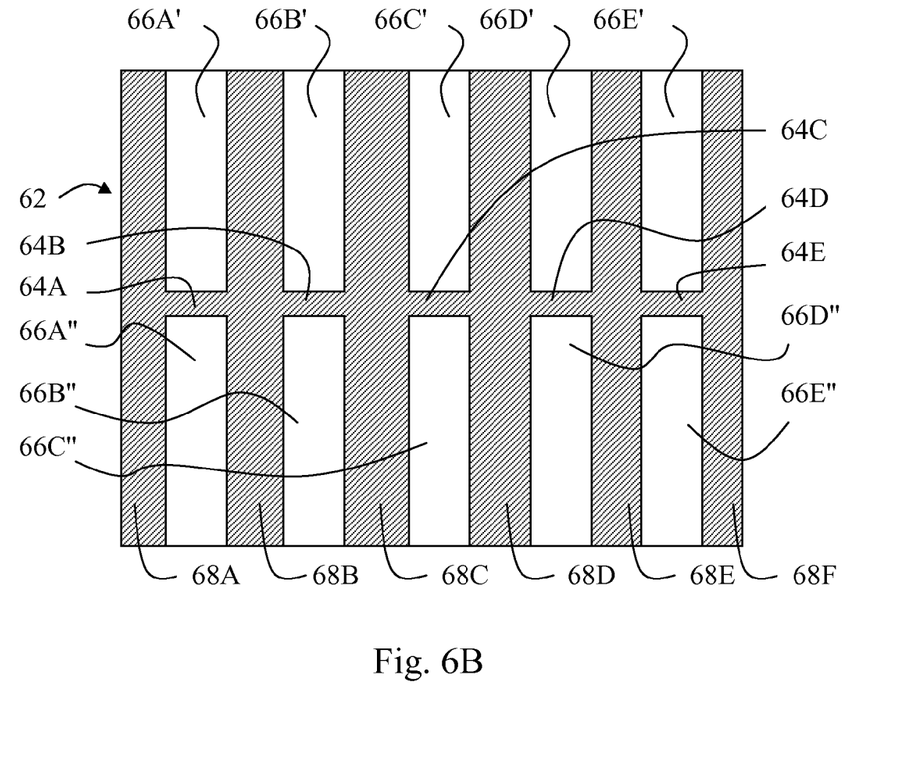
FIG. 6B is a frontal view of a feed distribution device having a horizontal portion.

FIG. 6B shows the same feed distribution device with the addition of horizontal pieces 64A-E connecting the vertical plates and separating each void in to two sections 66A'-E' and 66A"-E". These horizontal pieces can be for stability of the feed distribution device or to better diffuse and distribute the feed. While described here as multiple horizontal pieces, there may be only one horizontal piece that connects all or only a portion of the plates in the feed distribution device. Additionally, there may me multiple horizontal pieces connected to a single plate at various vertical positions.

As contacting device columns come in various types, and designs with various types of feeds it is advantageous to arrange the plates in each feed distribution device in different formations based on the requirements of the system. FIGS. 7A-E show several sections with one feed inlet with exemplary formations of single and multiple feed distribution device arrangements.

Figure 7A:
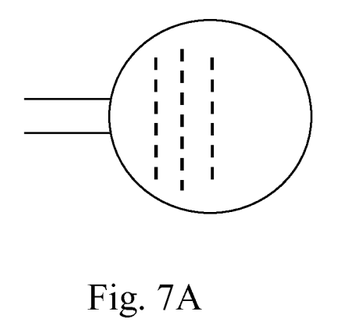
FIGS. 7A-7E show various formations and arrangements of feed distribution devices

FIG. 7A shows three feed distribution devices arranged in series, with the plates of each feed distribution device arranged in a straight line, parallel to each other. It can be seen that the plates of the middle feed distribution device are arranged such that they are in line with the voids of both the front and rear feed distribution device. It is often beneficial to the diffusion and distribution of a particular feed flow to arrange the plates of one feed distribution device to be in line with at least a portion of the voids of a second feed distribution device when viewed from the feed inlet. The same can be said for horizontal sections, if present, on multiple feed distribution devices in series. Additionally, the spacing between each of the feed distribution devices, between the first feed distribution device and the feed inlet, as well as the last feed distribution device and the opposite portion of the wall can vary and is determined by the design parameters of the system. It can also be seen in the figure that the spacing between the distal ends of each distribution device and the adjacent portion of the wall may vary.

Figure 7B:
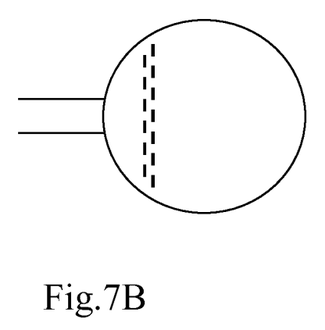

FIG. 7B shows a single feed distribution device whose plates are arranged in a staggered line.

Figure 7C:
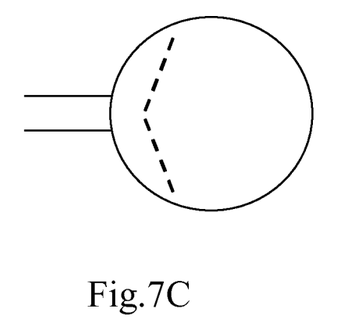

FIG. 7C shows a single feed distribution device whose plates are arranged in a V formation pointing at the feed inlet. While described as a single V formation, it is also contemplated that two distinct feed distribution devices can be arranged with an angle between them such that they will form more or less a V shape.

Figure 7D:
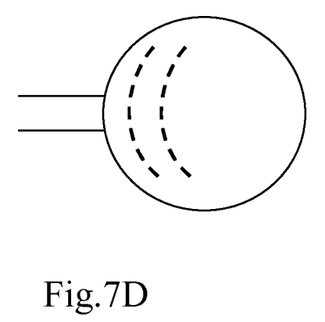

FIG. 7D shows two concentric feed distribution devices each arranged in the formation of regular arc having a constant radius.

Figure 7E:
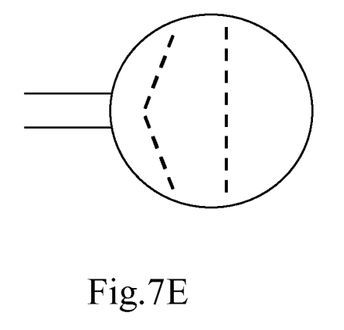

FIG. 7E shows a section containing two feed distribution devices, the first being arranged in the formation of a V and the second being arranged in the formation of a straight line. While several examples have been laid out here, they are not intended to be limiting in nature. One of ordinary skill in the art will recognize that there are numerous other arrangements, formations and combinations of feed distribution devices which can be successful in diffusing and distributing specific and general feed flows in to a section and are thereby incorporated in to the scope of the invention.

FIGS. 8A-F show several sections of a contacting distribution column having more than one feed inlet with exemplary formations of single and multiple feed distribution device arrangements.

Figure 8A:
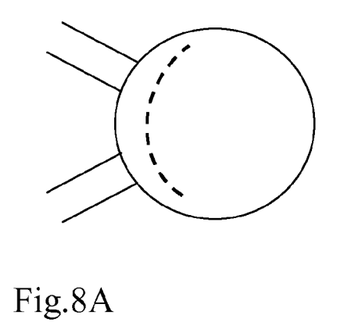
FIGS. 8A-8G show various formations and arrangements of feed distribution devices in a column section with more than one feed inlet.

FIG. 8A shows a section having two feed inlets having an angle between them of less than 180 degrees and a single feed distribution device arranged in the formation of a regular arc. The horizontal dimension, or arc length, of the single feed distribution device is sufficient to extend in front of both feed inlets.

Figure 8B:
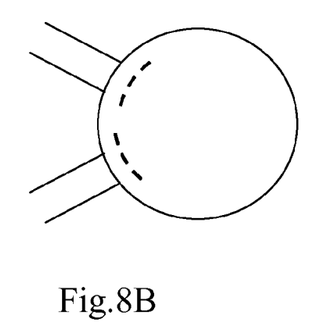

FIG. 8B shows a similar section with two feed inlets but having two separate feed distribution devices each arranged in the formation of a regular arc and each located substantially in front of their respective feed inlet.

Figure 8C:
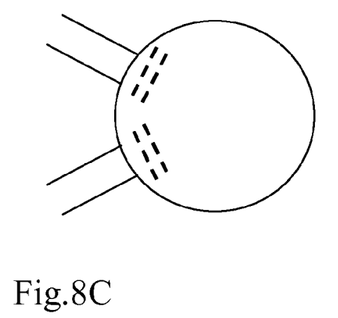

FIG. 8C shows a section with two feed inlets, each feed inlet having its own set of two feed distribution devices arranged in parallel straight lines. It can be the case that with two or more feed inlets there are differences in the feed flow properties of each. In such a case, it can be advantageous to have two different designs and arrangements of one or more feed distribution devices each in front of each respective feed inlet.

Figure 8D:
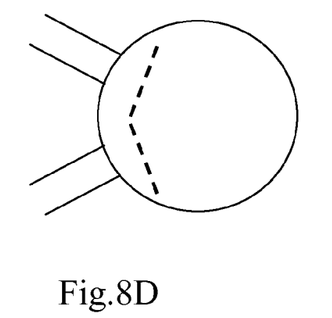

FIG. 8D shows a single feed distribution device arranged in the shape of a V so that each side of the V is located substantially in front of a different feed inlet.

Figure 8E:
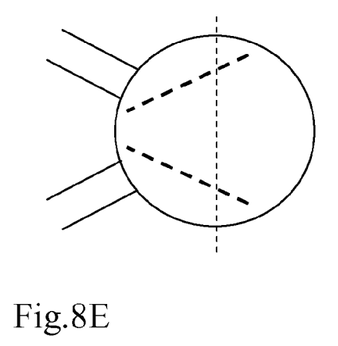
Figure 8F:
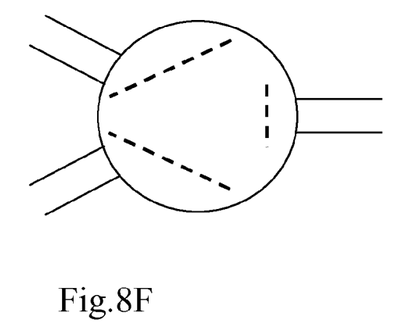

FIG. 8E shows a section with two separate feed distribution devices each arranged in a straight line with an angle between them. It can also be seen that each feed distribution device is located at least partially in both hemispheres of the column section. Lastly, FIG. 8F shows a section with three feed inlets, each feed inlet having at least a portion of a feed distribution device located in front thereof. One of ordinary skill in the art will recognize that there are numerous other arrangements, formations and combinations of feed distribution devices which can be successful in diffusing and distributing specific and general feed flows in to a section with more than one feed inlet and are thereby incorporated in to the scope of the invention.

Figure 8G:
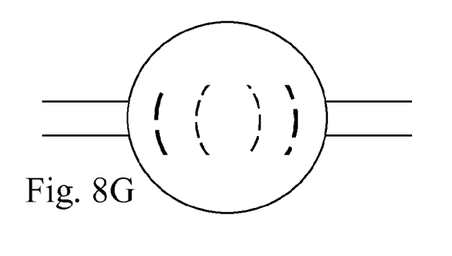

FIG. 8G shows a section with two feed inlets oriented at 0 and 180 degrees, i.e. opposite to each other with a series of feed distribution devices arranged substantially in front of each feed inlet. The first feed distribution device in each series is preferably located closer to the feed inlet than to the center of the column section to provide the optimal distribution of the feed. While four feed distribution devices are shown, in two identical series of mirrored image to each other, many other arrangements can be implemented. Additionally, the distinct series shown can also be connected to each other to form essentially two circular or ovular rings around the center of the column section.

FIGS. 7A-8G show numerous examples of feed distribution device arrangements. Each arrangement occupies only a small portion of the cross-sectional area of the contacting column. Furthermore, while the plates of the feed distribution device(s) are arranged so as to deflect a portion of feed flowing from a feed inlet, the overall restriction of the feed flow entering the column section is minimized by allowing a portion of the feed flow through the feed distribution device(s) unobstructed, or at least substantially unobstructed. By not redirecting or funneling the entire feed flow entering the column section the magnitude of the velocity of the feed flow is reduced upon encountering the feed distribution device(s) and entering the column section. As pressure drop is the magnitude of velocity squared, the arrangement of the feed distribution devices as shown in the figures and described above is capable of causing only a slight or even negligible pressure drop which is advantageous for numerous separation column operations.

Figure 9:
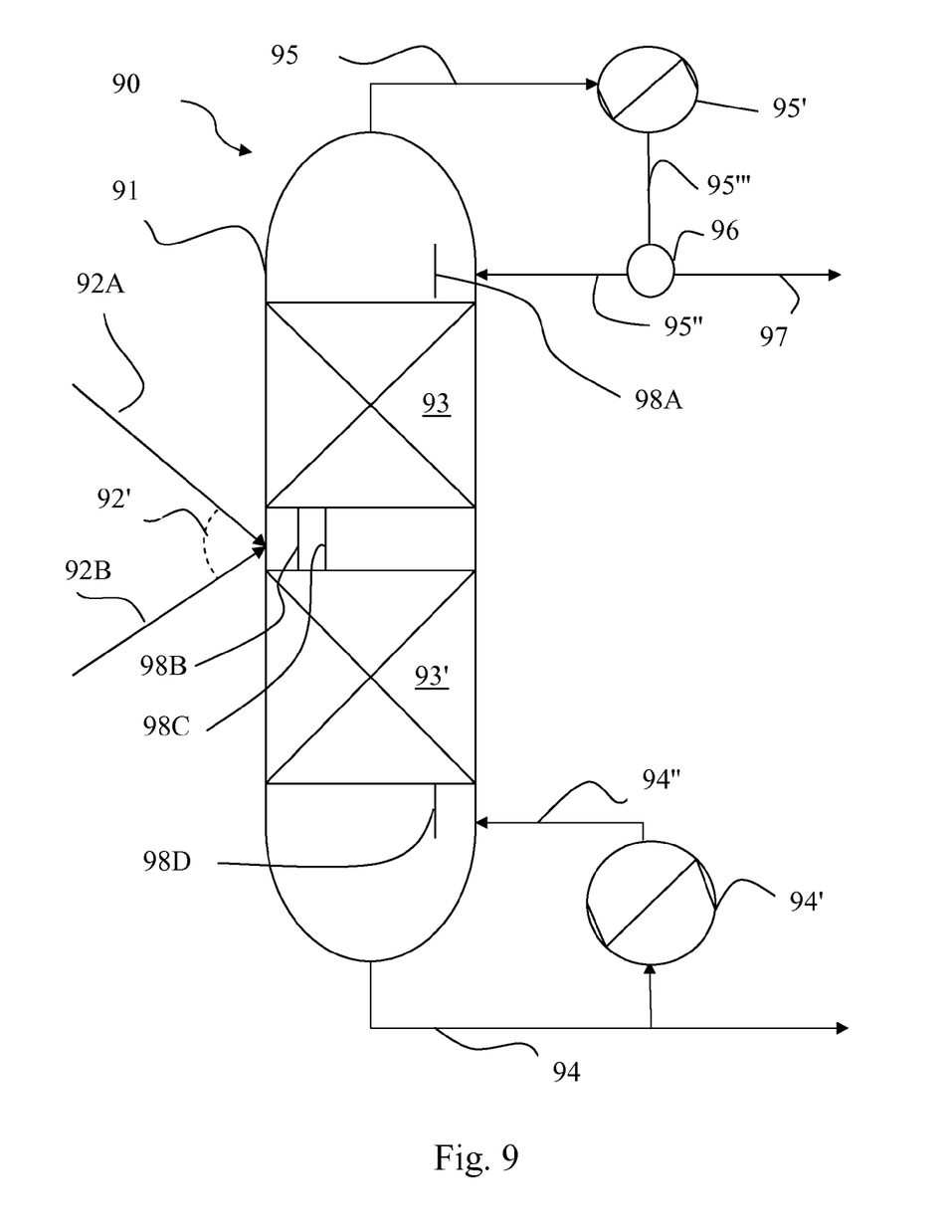
FIG. 9 is a schematic of a distillation column.

FIG. 9 shows a general setup of a vacuum distillation column 90 with outer wall 91 defining an interior for the separation of feed in to two streams, with each of these streams having composition different to that of the feed and different from each other. The column has two main feed inlets 92A and 92B feeding a single section of the column and having an angle 92' between the two. The two main feed inlets may be at the same vertical height on the column or at varying heights, but introduce their respective feeds in to the same section. While the angle 92' can be 180 degrees, it is often less than 180 degrees based on design parameters of the column and its surroundings. The section of the column to which the feed inputs introduce the feed is defined by the outer wall of the column 91 and the upper and lower separation sections 93 and 93' both made up of one or more packed beds or a number of trays immediately above and below the feed inlets. Each separation section 93 or 93', represented by a boxed rectangle, can consist or be comprised of several separation sections which can be that of for separation, distillation, heat transfer, extraction, wash operation or absorption depending on the design of the column.

Additionally, based on the location of the feed inputs on the vertical length of the column the top or bottom separation section may be a terminal end of the interior of column. At the bottom of the column is an outlet 94 for one stream where a portion of the output stream exits the system and a second portion of the output stream is input to a reboiler 94' and the stream after being sufficiently heated is reintroduced to the column with a feed inlet 94". The output stream from the column is heated in the reboiler and then reintroduced to the system providing the heat required by the separation, typically at a lower vertical position than the main feed inlet.

Further, the composition of the reintroduced feed from the reboiler and its flow properties at this point are typically different than that of the main feed due to the separation achieved by the column. Likewise, the output stream 95 at the top of the column is for the gas produced as a result of the separation effect in the column. The output stream is cooled in condenser 95' in order to condense the stream at least partially and simultaneously to remove the heat cascaded through the column by the separation. The stream 95''' coming out from the condenser 95' enters an overhead drum 96 where the gas portion and the liquid portion of the stream 95''' are separated from each other. The gas portion of stream 95''' is taken as product stream 97. The saturated or sub-cooled liquid portion of the stream 95''' is reintroduced to the column with a feed inlet 95".

For the feed inlet streams which vaporize at least partially when brought to the pressure prevailing at the feed inlet location in the column, there exists the potential for the feed flow and distribution to the separation section above to be less than ideal. In certain instances it becomes advantageous to add one or more feed distribution devices to the section in which the feed inlet is present to defuse and/or distribute the feed more optimally to the section above and/or below. Feed distribution devices 98B and 98C are located in the section containing the two main feed inlets 92A and 92B. These feed distribution devices can be of any arrangement and formation as desired by the designer of the system based on the parameters present in the section as well as other design criteria.

Depending on the design and serviceability requirements of the column the feed distribution devices may be more or less permanently attached or they may be coupled in such a way as to be removable or replaceable. Feed distribution devices 98B and 98C are shown as located between an upper and a lower separation sections 93 and 93'. Based on the different feed composition and flow properties between the feeds 92A, 92B, 94", 95" and their respective locations in the column, the feed distribution devices 98B-D may be of similar or different formation and arrangement. Feed distribution device 98D is shown as being below the lower most separation section 93'.

For the sake of completeness it can be noted that even though the feed in the above embodiment is not flashing at the location of feed distribution device 98A, it is naturally possible to arrange for such a feed distribution device at that location.

In some cases, feed input from the initial feed inlets represented by feeds 92A and 92B will be flashing. The actual feed before it enters the column may be gas, liquid or a mixture thereof, but once in the column there is a mixture of gas and liquid. Likewise, feed 94" can be gas, liquid or a mixture thereof, but in practice it is a flashing feed and therefore the feed once inside the column is a mixture of gas and liquid. Feed 95" is typically reflux and therefore only liquid when entering the column. However, when feed 95" is a flashing feed, and not reflux, a feed distribution device 98A is useful.

While the vacuum distillation column in FIG. 9 has only two outlet streams, it is possible to have more than two outlet streams and more than the depicted number of feed inlet streams. Regardless of the number of outlet and inlet streams, it is conceived that a feed distribution device can be placed in any section which has a feed input.

FIG. 9 depicts a general vacuum distillation column with main or initial feed inlet located vertically towards the middle of the column and a loop at each end, one loop for reboiling and a second loop for condensing. In certain applications however, specifically in the refining process of lube oil and its derivatives, the bottom loop needs to be divided into two parallel loops each having its own feed inlet back to the bottom of the column. Each feed inlet carries the output stream of a reboiler to the vacuum distillation column.

Figure 10:
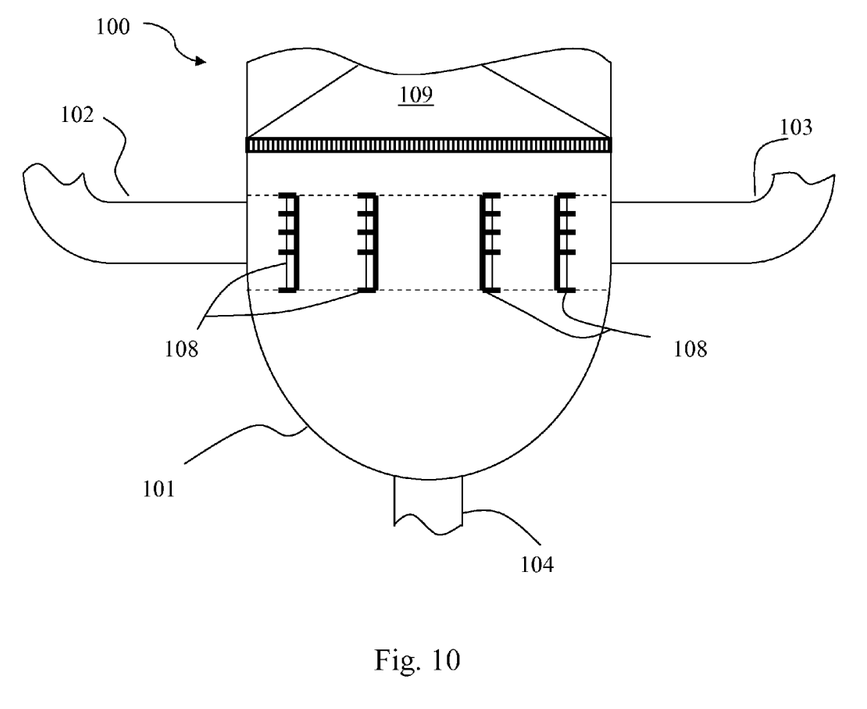
FIG. 10 is a schematic of the bottom portion of a distillation column with two feed inlets.

Such a bottom section 100 of a column 101 is depicted in FIG. 10, where the feeds from the two feed inlets 102 and 103 from loops connected to two parallel reboilers are introduced to the column. It is preferable to locate the two feeds opposite from each other, 180 degrees apart, as depicted, but angles less than 180 degrees are also used. Without a feed distribution device, a large empty vertical height is typically provided to facilitate close to ideal gas flow distribution to the separation section above these feed inlets. The ideal gas flow is that the gas flow is uniformly distributed to the cross-sectional area of the separation section facing the flow, 109. However, this arrangement requiring additional height is not sufficient to provide evenly distributed combined gas flow to the separation section above these feed inlets. By placing two feed distribution device 108 as arranged in FIG. 8G (inlets at opposite ends) in front of each inlet, the distribution of the gas flow can be greatly improved.

In the case of a vacuum distillation column for refining lube oils, a bottom section 100 of a column 101, as shown in FIG. 10, can be greater than five meters in diameter. Feed inlet pipes 102 and 103 can have diameters on the order of one to two meters. In such situations, the requisite space between the feed inlet and the support grid 109 underneath the first separation section, alternatively 109 can be a separation tray, can be as little as a meter with the aid of the feed distribution devices 108 of between two and three meters in height. This is greatly improved from the requisite height without the feed distribution devices.

Sometimes, due to physical restrictions or maintenance requirements it is not always possible to locate the feed inlets at the ideal separation of 180 degrees. When one of the feed inlets is moved so that the angle between the two feed inlets is less than 180 degrees, say with a separation of only 30-90 degrees, for example 60 degrees, then the total feed distribution of the two feed flows to the separation section above the feed inlets is less than optimal and the efficiency of the entire vacuum distillation column is reduced. Again, by using two feed distribution devices as depicted by FIG. 5 (two inlets separated by 60 degrees and feed distribution devices of 7D) the distribution of the gas flow can be greatly improved.

By placing the feed distribution devices substantially in front of the two feed inlets, such that they are not completely blocking the inlet but cause a portion of each flash feed to strike them, the result is that the originally unevenly distributed gas portions of the feeds are now substantially more evenly distributed to the cross-sectional area of the separation section above increasing the separation efficiency, reducing the magnitude of the local velocity maximum of at least a portion of the flash feed flow decreasing design requirements, i.e. empty height at the top of the section containing the feed inlets. The direction of the gas flow originating from these two flash feed flows is directed substantially quicker from its original, substantially horizontal direction defined by the feed inlet, to its preferred vertical direction, substantially normal to the original direction and parallel with that of the column walls, thereby reducing the requisite height of the bottom most section in the column. Based on the advantages of using the feed distribution devices of the present invention in such a column allows for shorter columns with lower pressure drops. This directly correlates to columns that are cheaper to produce, operate and maintain.

Such feed distribution devices allow columns to be built without two feed inputs necessarily being located opposite, 180 degrees, from each other. Additionally, such feed distribution devices allow existing columns with non-symmetric feed inlets to be retrofitted to increase efficiency and lower operating cost.

Another advantage to the present feed distribution device is its relative simplicity. Unlike other potential feed distribution devices, the simple arrangement of plates and voids as described above is easily transferred to computational and modeling software to provide accurate and detailed flow dynamics analysis using low to moderate computing resources. The conditions present in the section of a separation column where one or more feed inlets are introduced are complex. Adding additional complicated structures imposing a large and often times unmanageable strain on current computational and modeling software, as well as computer hardware. Due to this, it is often not feasible to easily and accurately model complex devices to determine how effective a given design will be.

However, with the relative simplicity of the plate and void design as described herein, it becomes exceedingly feasible to accurately model the flow dynamics and characteristics in the section of a column with such a device. By being able to accurately model expected flow dynamics it now becomes feasible to easily and efficiently determine the effect of a particular design in a particular application and to optimize the height and characteristics of a potential feed distribution device and associated column. This allows for more efficient and cost effective columns to be built. Additionally, the same computations and modeling can be applied to existing columns to select a feed distribution device arrangement that allows for the most improved efficient operation. This increase in separation efficiency leads to lowering operational and maintenance costs.

Accordingly, there have been described here exemplary embodiments of the present invention containing particular detail to the specific embodiments. It will be recognized by those having ordinary skill in the art that different formations, arrangements, locations, compositions and coupling of plates in feed distribution devices not explicitly disclosed here in can be conceived without departing from the scope and inventive concept of the present invention.

The invention claimed is:

1. A section of a contacting column, the section comprising;
   at least one feed inlet to an interior portion of said column section;
   at least one feed distribution device located in said interior portion of the column,
   each feed distribution device is being formed by a plurality of plates with voids between them, and
   wherein a first feed distribution device is arranged substantially in front of at least a first feed inlet such that the plates are capable of deflecting at least a portion of a feed flow introduced from the first feed inlet in a vertical direction, substantially normal to the original direction of the feed flow from the first feed inlet, and the voids between the plates are capable of allowing another portion of the feed flow introduced from the first feed inlet through the feed distribution device with no, or significantly lower, angle of deflection.

2. A section according to claim 1, wherein the plates of each of the feed distribution devices have dimensions sufficient to disperse the feed evenly throughout the section and being arranged in a formation chosen from the following group; straight line, staggered line, regular arc, irregular arc and V.

3. A section according to claim 1, wherein one or more second feed distribution devices are separate from, and arranged parallel or concentric to, the first feed distribution device in a series of such devices.

4. A section according to claim 3, wherein the plates of the one or more second feed distribution devices, in series with the first feed distribution device, are arranged at least partially in-line with the voids of the first feed distribution device.

5. A section according to claim 1, wherein there is a separation section above and/or below the one or more feed distribution devices.

6. A section according to claim 1, wherein the first feed inlet is separate from each feed distribution device.

7. A section according to claim 1, wherein the section has two feed inlets separated by, or less than, 180 degrees, and the at least one feed distribution device is arranged in a formation, and with sufficient horizontal dimension to be substantially in front of both feed inlets.

8. A section according to claim 1, wherein the plates of the at least one feed distribution device are arranged to deflect at least a part of a feed flow introduced to the section from said first feed inlet from its original direction defined by said feed inlet, to a direction substantially normal to the original direction and substantially parallel to the walls of the column.

9. A section according to claim 1, wherein the plates of the at least one feed distribution device are capable of reducing the magnitude of local velocity of at least a portion of a flash feed entering the separation section above the feed inlet.

10. A section according to claim 1, wherein the feed distribution device is arranged substantially in front of the first feed inlet is such a way that the feed will meet at least a part of the feed distribution device at a position closer to the feed inlet than to the center of the column section.

11. A method of operating a contacting column, the contacting column having walls, at least one separation section and at least one feed inlet to a section of said column, the method comprising the steps of;
   introducing a feed flow to the section of the column through a feed inlet;
   using a feed distribution device for causing a portion of the feed flow that contacts the at least one feed distribution device to be deflected, and
   using a distribution device comprised of a plurality of plates with voids between them being orientated in such a way that the plates deflect at least a portion of the feed flow in a vertical direction, substantially normal to the original direction of the feed flow and the voids between the plates allow another portion of the feed flow introduced from the first feed inlet through the feed distribution device with no, or significantly lower, angle of deflection.

* * * * *